Patented July 15, 1947

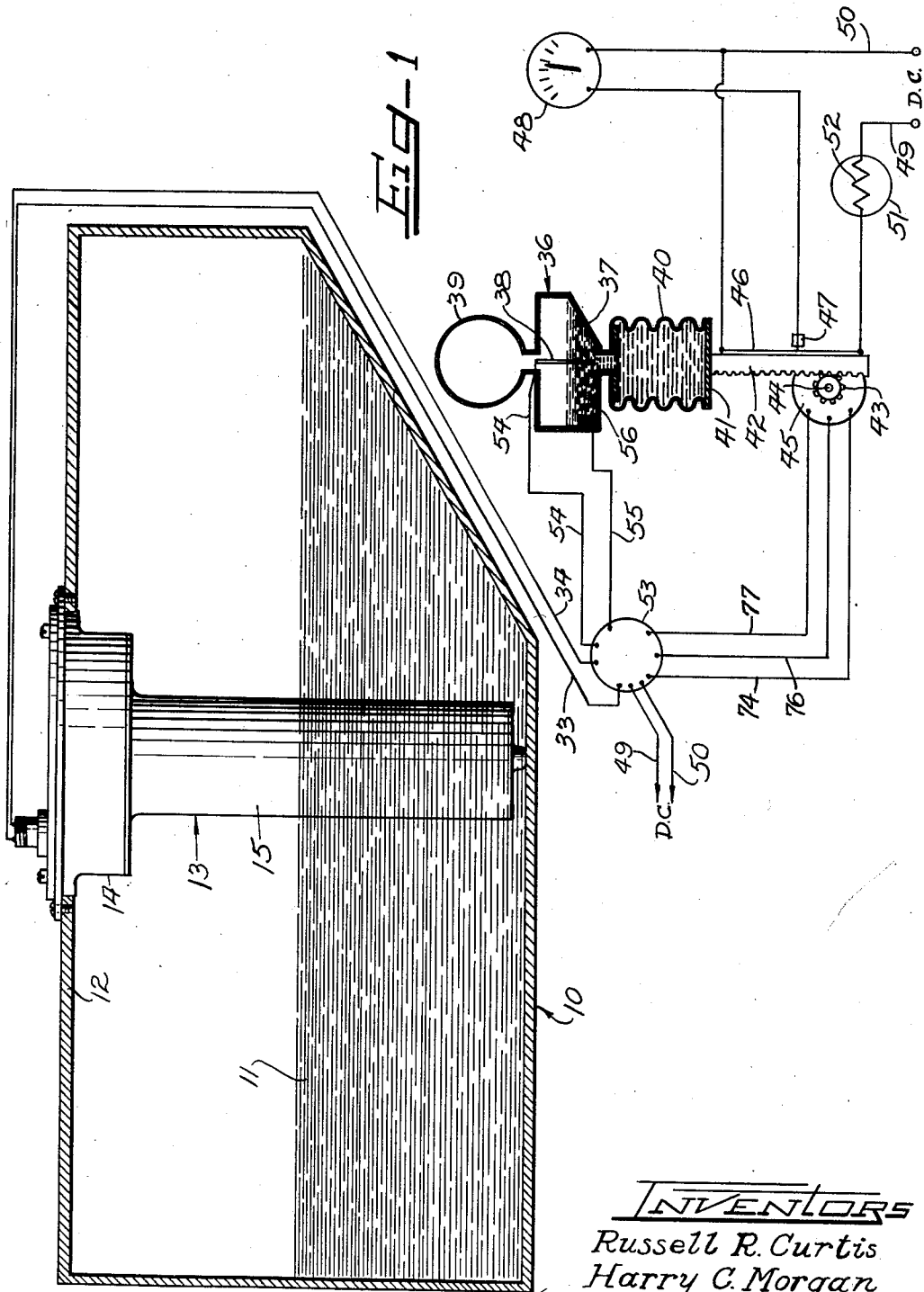

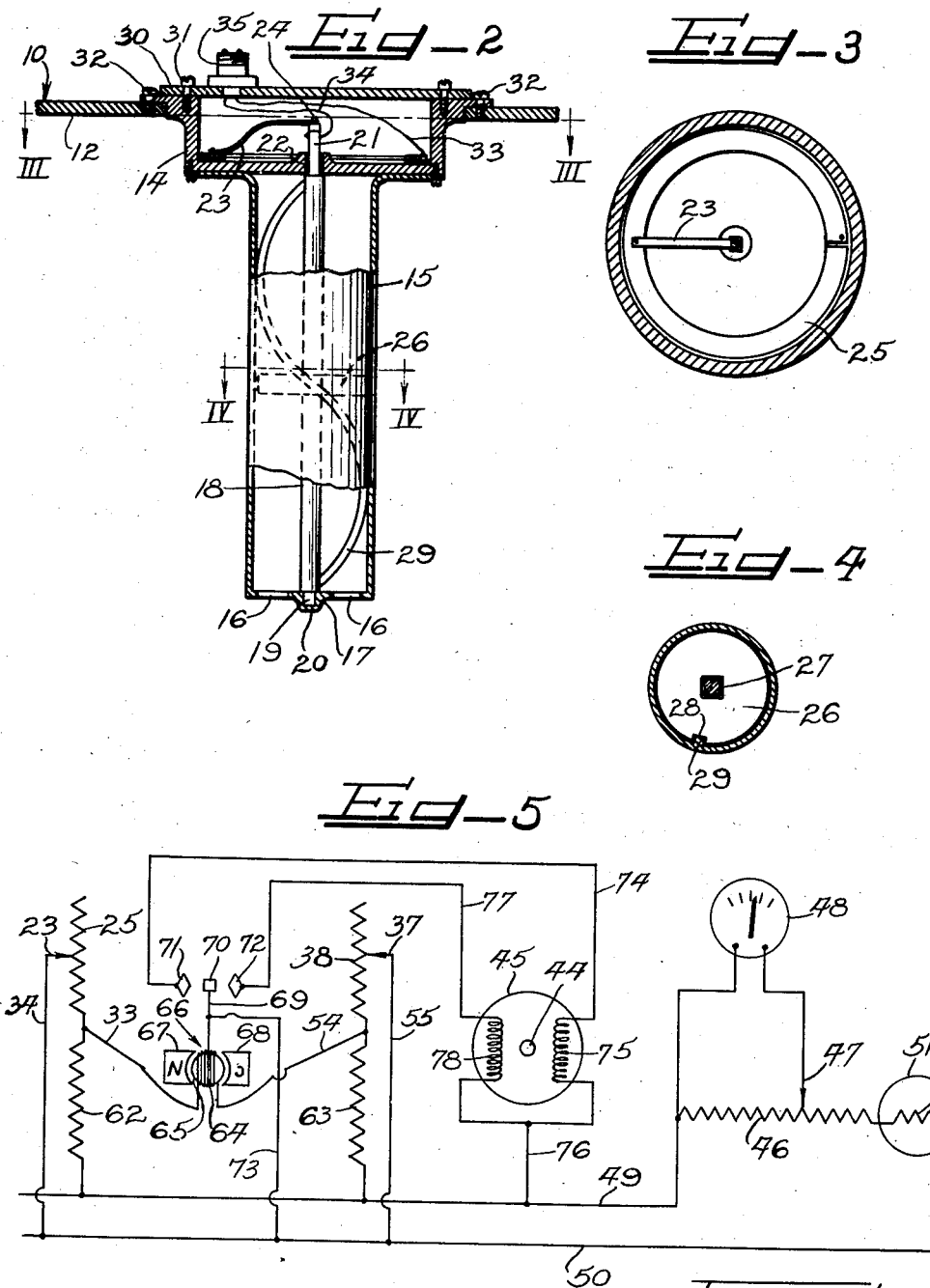

2,423,875

UNITED STATES PATENT OFFICE 2,423,875

FUEL GAUGE

Russell R. Curtis and Harry C. Morgan, Dayton, Ohio, assignors, by mesne assignments, to Thompson Products, Inc., Cleveland, Ohio, a corporation of Ohio Application May 20, 1944, Serial No. 536,482

7 Claims. (Cl. 73—290)

This invention relates to a fluid volume indicator and more particularly to a fluid volume indicator such as a fuel gauge which will indicate the quantity of fuel in a tank and automatically compensate for the shape of the fuel tank and for the orientation, including the tip, of an aircraft or other body on which the fuel tank is mounted.

Many fuel gauges have been devised in the past which would give a constant indication of the amount of fuel remaining in a fuel tank. Many of these fuel gauges have been of the electrically operated type. Great difficulty has been experienced, however, in providing a fuel gauge which would give a correct indication irrespective of the attitude of the craft on which the fuel tank is mounted (i. e., the relative angular position of the craft with respect to a horizontal plane). Difficulty in this connection has been particularly pronounced where it was necessary to compensate for the shape of fuel tanks.

There has also been considerable difficulty experienced in obtaining an accurate reading during periods of acceleration or deceleration of the craft due to the shifting position of the fuel in the tank during this period.

It is an object of the present invention to provide an indicator of novel construction which overcomes the difficulties indicated above.

A further object of the present invention is to provide a novel fuel gauge which automatically compensates for the shape of the fuel tank as well as for the attitude of the aircraft or other body on which the fuel tank is mounted.

Another object of the present invention is to provide an indicating means for giving the amount of fuel in a fuel tank which includes providing a small model tank or scale model replica which is an exact duplicate except for size of the main fuel tank, and in which a body of liquid is maintained at all times which is a linear proportion of the volume of fuel in the main tank.

Another and still further object of the present invention is to provide a novel electrical control circuit for a fuel gauge or other indicating instrument.

The novel features which we believe to be characteristic of our invention are set forth with particularity in the appended claims. The invention itself, however, both as to its organization, manner of construction and method of operation, together with further objects and advantages thereof, may best be understood by reference to the following description taken in connection with the accompanying drawings, in which:

Figure 1 is a sectional view of a fuel tank together with a schematic illustration of the fuel gauge for constantly indicating the amount of fuel in the fuel tank;

Figure 2 is a vertical sectional view through the float tube of the main fuel tank;

Figure 3 is a horizontal sectional view looking down on the upper end of the float tube structure taken along the line III—III of Figure 2;

Figure 4 is a horizontal sectional view through the float tube immediately above the float, as taken along the line IV—IV of Figure 2; and Figure 5 is a wiring diagram illustrating the electrical circuit of the fuel gauge shown in Figure 1.

Referring first to Figure 1 of the drawings there is shown therein a fuel tank 10 which is shown by way of example as being of irregular section and containing a fuel 11 therein. Depending from the top wall 12 of the fuel tank 10 is a float tube structure 13 which includes a cup-shaped member 14 and a long depending tube 15 which is in open communication with the fuel 11 in the tank 10 such as through the openings 16 in the bottom wall 17 of the tube 15.

Centrally disposed within the tube portion 15 is a shaft 18 of square cross-section throughout the major portion of its length. This square shaft 18 has a lower cylindrical end portion 19 which is rotatably mounted in the boss 20 of the base plate 17. The upper end of the shaft 18 is provided with a cylindrical end portion 21 which is journalled in a sleeve 22 carried by the cup 14. A leaf spring contact finger 23 is rigidly secured to the upper end of the shaft 18 as at 24. The free end of the finger 23 rides on a split ring 25 of suitable resistance material.

A float disk 26 is provided which fits loosely within the tubular portion 15 and rides freely on the shaft 18. To this end the disk 26 is provided with an opening 27 of square cross-section. The disk 26 is also provided with a notched-out portion 28 into which projects a rib 29 formed on the interior wall of the tubular portion 15. This rib 29 extends helically up the interior wall of the tube 15, but as is clearly shown in Figure 2 of the drawings, only one turn of the helix is formed. It will thus be understood that, as the float disk 26 rises or falls within the tubular portion 15, the angular position of the notched-out portion 28 of the float disk 26 is progressively changed. This, in turn, causes an angular movement of the square-shaped shaft 18. As will further be understood from an inspection of Figures 2 and 3 of the drawings, the movement of the float disk causes movement of the contact finger 23 to vary the amount of the resistance 25 which is inserted in the electrical control circuit presently to be described.

When the fuel tank is empty the maximum amount of resistance is provided by the resistance 25 and the contact 23 while the minimum amount of resistance is provided by the resistance 25 and the contact finger 23 when the fuel tank is full.

The cup-shaped member 14 is closed by a plate or cap 30 which is provided for that purpose and which is retained in place by the bolts 31. The cup-shaped member 14 is secured to the upper wall 12 of the fuel tank 10 by means of bolts 32. The conductors 33 and 34 which connect with one end of the resistance element 25 and the movable contact finger 23 respectively, are brought out through a suitable conduit 35.

As is illustrated in Figure 1 of the drawings, a small model tank 36, being in every respect a small-scale duplicate of the main fuel tank 10, is mounted on the same craft as the fuel tank 10. This model tank 36 is also mounted so that it is oriented in the same way as the main fuel tank 10. This is for the purpose of assuring that when the aircraft or other body on which the fuel tank is mounted changes its attitude, or in other words, its relative angular position, the model tank 36 changes its angular position the same amount. It will also be apparent that the same acceleration forces which act on the fluid in the fuel tank 10 will also act on the fluid presently to be referred to as contained within the model tank 36.

The model tank 36 is shown partially filled with a conducting liquid 37, such as mercury or some ionizable solute dissolved in alcohol or other solvent. A resistance rod 38 formed of some material such as carbon extends into the conducting liquid 37 in a position exactly similar to the float gauge or tube 15 in the fuel tank 10. The length of the rod 38 which is not immersed in the liquid 37, determines the effective resistance of the rod 38.

An air reservoir 39 is connected at the top of the tank 36 so as to take care of the air displaced out of the tank 36. This permits a hermetically sealed unit which tends to eliminate errors due to loss of fluid. A bellows liquid reservoir 40 is employed to supply or remove liquid from the tank 36. The volume of the reservoir 40 is caused to vary by shifting the movable end 41 by means of a rack 42 which meshes with a small pinion gear 43 carried on the rotor shaft 44 of a small reversible electric motor 45.

While the amount of liquid displaced from the reservoir 40 could be indicated by a linear scale associated with a pointer attached directly to the lower end of the bellows 40, the preferred arrangement is to provide a resistance strip 46 attached to the rack 42 and which is engaged by a stationary or fixed brush 47. The varying potential drop between the upper end of the resistance strip 46 and the brush 47 is directly a function of the position of the rack 42 and by measuring this voltage drop by a meter 48, the meter may be calibrated directly in units (such as gallons) of fuel contained in the main reservoir 10. A potential is impressed across the resistance strip 46 from a suitable source of D. C. power supplied through the power supply conductors 49 and 50. Preferably a voltage regulator 51 is incorporated in this circuit in order to eliminate errors brought about by a fluctuating power supply voltage. While this voltage regulator 51 may be any of a wide variety of types, it has been found that a ballast resistance 52 in the form of an iron resistance wire housed in an atmosphere of hydrogen provides a very satisfactory arrangement.

The reversible electric motor 45 is under the control of a micro-relay 53 which determines the direction of rotation of the rotor shaft 44 as well as the time when the motor 45 is energized. The electrical circuit of the micro-relay will presently be described in detail in connection with Figure 5. For the present it is sufficient to say that the conductors 33 and 34, which extend from the resistance element 25 and contact finger 23, are connected to the micro-relay 53. Also connected to the micro-relay 53 are the conductors 54 and 55 which are connected respectively to the resistance rod 38 and a finger 56 which extends into the conducting fluid 37 of the model tank 36. Power is supplied to the micro-relay 53 through a pair of D. C. power supply conductors 49 and 50. Micro-relay 53 is connected to the motor 45 through three-conductors 74, 76 and 77.

Referring now to Figure 5 of the drawings, the electrical circuit will be described. The diagrammatic representations in Figure 5 which correspond to elements already referred to in connection with the other figures of the drawings, have been given the same reference characters. The resistance element 25 is associated with the main fuel tank 10; and the resistance rod 38 associated with the model tank 36, are connected in a Wheatstone bridge arrangement with two fixed resistance elements 62 and 63. The portion of the resistance element 25 between the contact finger 23 and the terminal connection with the conductor 33, is connected in series with the fixed resistance 62 across the power source 49 and 50. The portion of the resistance rod 38 lying between the upper surface of the conducting liquid 37 in the model tank 36 and the upper terminal connection with the conductor 54 is connected in series with the fixed resistance 63 across the power supply conductors 49 and 50. The conductors 33 and 54 are connected to the opposite ends of the moving coil 64 of the rotor element 65 of a galvanometer generally indicated by the reference character 66. This moving element 65 is mounted for angular movement in a conventional manner between the poles 67 and 68 of a permanent magnet. The movable element 65 carries a contact arm 69 having a contact 70 at the outer end thereof which is arranged to engage either a stationary contact 71 or stationary contact 72 mounted on opposite sides thereof. The movable contact arm 69 is connected through conductor 73 to the power supply conductor 50. The stationary contact 71 is connected through a conductor 74 and a field winding 75 of the motor 45 and a conductor 76 to the power supply conductor 49. The stationary contact 72 is connected through a conductor 77 and a field winding 78 of the motor 45 and the conductor 76 to the power supply conductor 49. It will be understood that when the field winding 75 is energized the motor is energized for rotation in one direction while if the field winding 78 is energized the motor is arranged for rotation in the opposite direction.

When the level in the main fuel tank 10 changes, the position of the contact finger 23 changes and varies the amount of resistance in that arm of the Wheatstone bridge. This causes an unbalancing of the bridge and the pointer or arm 69 of the galvanometer will move to close one of the contacts 71 or 72. Which of these contacts 71 or 72 is engaged by the movable contact 70 will depend on whether the ratio of the resistances 25 and 38 is increased or decreased.

A decrease in the fuel level within the main tank 10 is represented by an upward movement of the contact 23 in the diagrammatic view of Figure 5, since a decrease in fuel causes an increase in the amount of resistance inserted into the circuit. Let us assume that this causes movement of the contact arm 69 to the left, causing the movable contact 70 to engage with the contact 71. This energizes the motor field winding 75 in such a direction as to cause clockwise movement of the rotor shaft 44 as viewed in Figure 1 of the drawings. This causes the bellows 40 to be extended and such movement results in a decrease in the amount of conducting fluid 37 within the model tank 36. This increases the amount of resistance introduced into the other arm of the Wheatstone bridge by the resistance rod 38. When this amount of resistance is enough to balance the bridge again, the galvanometer element 65 causes the movable contact 70 to move to its neutral or center position again, thus deenergizing the motor 45.

From the above description it will be apparent that the circuit of Figure 5 is arranged at all times to cause a balance to be maintained between the resistance introduced into the Wheatstone bridge circuit by the resistance element 38 with the resistance introduced by the resistance element 25.

The amount of fuel maintained in the model tank 36 thus bears the same relation to its tank as does the amount of fuel 11 in the main tank 10.

When the craft on which the main fuel tank 10 and the model tank 36 are mounted changes its relative horizontal position or attitude, it will be apparent that the change in the position of the fluid 37 in the model tank 36 will correspond exactly to the change in relative position of the fuel 11 in the main tank 10. This will not cause an unbalance in the bridge circuit even though all of the fluid in each of the tanks has been shifted over to one end of the tank. The reason is that we get a corresponding change in both resistance elements 25 and 38 which are inserted in the Wheatstone bridge circuit, and no unbalanced condition results which will cause energization of the motor 45. We thus see that a correct and accurate fuel reading is given at all times irrespective of the angular position of the craft on which the fuel tank is mounted.

For the same reasons as explained immediately above, a shift in the position of the fluid 11 in the main fuel tank 10 due to rapid acceleration or deceleration does not cause a faulty indication of the fuel level, since the same accelerating or decelerating forces are acting on the fuel in the model fuel tank 36. Thus, shifts of fluid caused by accelerating or decelerating forces cause the same proportional changes in the resistance values 25 and 38 and no unbalanced condition results.

While we have shown a particular embodiment of our invention, it will, of course, be understood that we do not wish to be limited thereto, since many modifications may be made, and we therefore contemplate, by the appended claims, to cover all such modifications as fall within the true spirit and scope of our invention.

We claim as our invention:

1. A fluid volume indicator for a fluid container comprising a scale model replica of said container which is mounted in such a position as to bear the same orientation in all planes as said container, a fluid reservoir connected to said scale model replica, means in said container responsive to the fluid level along a predetermined path extending between the top and bottom of the container, means in said scale model replica responsive to the fluid level therein along a predetermined path corresponding in all respects to the path of said container, means for establishing a voltage drop proportional to the position of the fluid in said container along its path, means for producing a second voltage drop proportional to the position of the fluid in said scale model replica along its path, pumping means for introducing fluid into said scale model replica from said reservoir and for withdrawing fluid therefrom, a reversible motor for operating said pumping means, means for operating said motor to maintain the fluid level along said path in said scale model replica at such a point that the ratio between said voltage drops remains constant, and means responsive to the quantity of fluid in said scale model replica for indicating the amount of fluid in said container.

2. A fluid volume indicator for a fluid container comprising a scale model replica of said container which is mounted in such a position as to bear the same orientation in all planes as said container, level indicating means including a float tube having a float therein, a variable resistance, means for varying the value of said resistance as a function of the position of said float in said float tube, an elongated resistance element positioned in said scale model replica in the same relative position as said float tube in said container, a conducting fluid in said scale model replica, means for introducing a voltage drop across said variable container resistance, means for introducing a voltage drop across the portion of said elongated resistance element which remains above said conducting fluid, and automatic means for varying the fluid content of said scale model replica to maintain the same resistance ratio between said tank resistance and said resistance element, whereby the quantity of conducting fluid in said scale model replica is an indication, in proportional scale, of the amount of fluid in said container.

3. A fluid volume indicator for a fluid container comprising a scale model replica of said container which is mounted in such a position as to bear the same orientation in all planes as said container, a fluid in said scale model replica, means in said container responsive to the fluid level along a predetermined path extending along the top and bottom of the container, means in said scale model replica responsive to the fluid level therein along a predetermined path which is a scale model replica of said container path, an electric resistance element, means for varying the value of said resistance as a function of the position of the fluid in said container along its path, a second electric resistance element, means for varying the value of said second resistance as a function of the position of the fluid in said scale model replica along its path, a balanced bridge circuit having said first and second resistance elements in two balancing portions thereof, said bridge circuit being in balanced condition when the fluid level in said scale model replica along its path is in scale proportion to the fluid level in said container along its path, means for varying the quantity of fluid in said scale model replica to maintain said bridge in balance, and means responsive to the quantity of fluid in said scale model replica for indicating the amount of fluid in said container.

4. A fluid volume indicator for a fluid container comprising a scale model replica of said container which is mounted in such a position as to bear the same orientation in all planes as said container, level responsive means including a float tube having a float therein, means for rotating said float as a function of the axial position of said float within said tube, a variable resistance, means for varying the value of the said resistance as a function of the angular position of said float within said float tube, a resistance rod positioned in said scale model replica in the same relative position as said float tube in said container, a conducting fluid in said scale model replica, means for impressing a voltage across said variable container resistance, means for impressing a voltage across the portion of the resistance rod which remains above said conducting fluid, and automatic means for varying the fluid content of said scale model replica to maintain the same resistance ratio between said tank resistance and said resistance element whereby the quantity of said conducting fluid in said scale model replica is an indication, in proportional scale, of the amount of fluid in said container.

5. A fluid level indicator for a fuel tank including a scale model of said tank having a bellows reservoir depending therefrom and in fluid communication therewith, a fluid in said reservoir and in said scale model, an air chamber in communication with the upper part of said scale model, means for gradually collapsing and expanding said bellows to add or remove fluid from said scale model, a variable resistance including a resistance element and a contact element, one of said elements being mounted for movement with said bellows, means for impressing an E. M. F. across said resistance element, said last means including a voltage regulator, a voltmeter connected between said contact element and a point on said resistance element, and means for operating said collapsing and expanding means to maintain the fluid level within said scale model at the same proportional level as the fuel level in said fuel tank, whereby said voltmeter readings are a proportional indication of the fuel level in said fuel tank.

6. A fluid level indicator for a fuel tank including a scale model of said tank having a bellows reservoir depending therefrom and in fluid communication therewith, a fluid in said reservoir and in said scale model, a rack bar depending from the lower end of said bellows, a reversible electric motor having a pinion on the drive shaft thereof, said pinion being meshed with said rack bar, a resistance element mounted along said rack bar, a stationary contact element in engagement with said resistance element, means for impressing an E. M. F. across said resistance element, a voltmeter connected between said contact and one end of said resistance element, automatic means for selectively energizing said motor to collapse and expand said bellows to maintain the fluid within the said scale model at the same proportional level as the fluid level in said fuel tank, whereby the voltage impressed across said voltmeter is a function of the fuel level within said fuel tank.

7. A fluid volume indicator for a fluid container comprising a scale model of said container which is mounted in such a position as to bear the same orientation in all planes as said container, a level indicating means including a float tube having a float therein, a variable resistance, means for varying the value of said resistance as a function of the position of said float in said float tube, an elongated resistance element positioned in said scale model replica in the same relative position as said float tube in said container, a conducting fluid in said scale model replica, said scale model having a bellows reservoir depending therefrom and in fluid communication therewith, a reversible electric motor for collapsing and expanding said bellows to add and remove fluid from said scale model, a pair of direct current power supply conductors, a first and a second fixed resistor, said first and second fixed resistors, said variable resistance and said elongated resistance element being connected in a square-form bridge circuit, means for connecting said power supply conductors to two opposite corners of said square-form bridge circuit, a micro relay including a galvanometer movement having a movable coil, said coil being connected across the other two corners of said bridge circuit, said coil having a movable contact arm associated therewith and movable in response to movement of said coil, a pair of stationary contacts on opposite sides of said movable contact connected to the forward and reverse windings respectively of said motor, the other ends of said forward and reverse windings being connected to one of said power supply conductors, and said movable contact and said galvanometer movement being connected to the other of said power supply conductors, whereby said motor is energized in such a manner as to maintain the fluid level in said scale model at such a point that the portion of said elongated resistance element above the fluid in said scale model balances the resistance introduced in said bridge circuit by said variable resistance.

RUSSELL R. CURTIS.
HARRY C. MORGAN.

REFERENCES CITED

The following references are of record in the file of this patent:

UNITED STATES PATENTS

| Number | Name | Date |
| --- | --- | --- |
| 2,180,175 | Sivertsen | Nov. 14, 1939 |
| 2,353,691 | Clingman | July 18, 1944 |
| 712,699 | May | Nov. 4, 1902 |
| 1,175,417 | Fehrenbach | Mar. 14, 1916 |
| 1,231,964 | Suchanek | July 3, 1917 |
| 2,252,368 | Germer | Aug. 12, 1941 |
| 1,849,335 | Schmidt | Mar. 15, 1932 |
| 829,161 | Kjerulff | Aug. 21, 1906 |

FOREIGN PATENTS

| Number | Country | Date |
| --- | --- | --- |
| 484,764 | Great Britain | May 10, 1938 |